(12) United States Patent
Chapman et al.

(10) Patent No.: US 12,470,570 B2
(45) Date of Patent: Nov. 11, 2025

(54) METHOD AND SYSTEM FOR PROCESSING DATA PACKAGES

(71) Applicant: Egress Software Technologies IP Limited, London (GB)

(72) Inventors: Jack Chapman, London (GB); Thomas Hazell, London (GB)

(73) Assignee: Egress Software Technologies IP Limited, London (GB)

( * ) Notice: Subject to any disclaimer, the term of this patent is extended or adjusted under 35 U.S.C. 154(b) by 0 days.

(21) Appl. No.: 18/191,622

(22) Filed: Mar. 28, 2023

(65) Prior Publication Data

US 2023/0325414 A1 Oct. 12, 2023

(30) Foreign Application Priority Data

Mar. 30, 2022 (GB) .................................. 2204562
Mar. 30, 2022 (GB) .................................. 2204563
Mar. 30, 2022 (GB) .................................. 2204564
Mar. 30, 2022 (GB) .................................. 2204565

(51) Int. Cl.
*G06F 16/00* (2019.01)
*G06F 16/28* (2019.01)
*H04L 9/40* (2022.01)
*H04L 45/74* (2022.01)
*H04L 51/212* (2022.01)
*H04L 69/22* (2022.01)

(52) U.S. Cl.
CPC ........ *H04L 63/1416* (2013.01); *G06F 16/285* (2019.01); *H04L 45/74* (2013.01); *H04L 51/212* (2022.05); *H04L 63/0245* (2013.01); *H04L 63/123* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 2013/0086181 | A1* | 4/2013 | Vitaldevara | G06Q 10/107 709/206 |
| 2020/0067861 | A1* | 2/2020 | Leddy | G06F 21/6245 |
| 2021/0092154 | A1* | 3/2021 | Kumar | H04L 63/1425 |

FOREIGN PATENT DOCUMENTS

| | | | | |
|---|---|---|---|---|
| GB | 2581188 A | | 8/2020 | |
| GB | 2581188 B | * | 9/2021 | ............. G06N 20/00 |

* cited by examiner

*Primary Examiner* — Anhtai V Tran
(74) *Attorney, Agent, or Firm* — EIP US LLP

(57) ABSTRACT

A method, system and non-transitory computer-readable medium for classifying a received data package, using a framework comprising a classifier, a processing component for processing the data package using the classifier, and a database for storing relationship data indicating relationships between a sender and a recipient. The classifier is configured to obtain header data of the received data package, the header data comprising user identifiers corresponding to the sender and the recipient, and to obtain data representing a relationship between the sender and the recipient from the database. A relationship metric is determined based on the relationship, wherein the relationship is indicative of a communication history between the sender and the recipient. A handling action is then applied to the received data package based on the relationship metric, and the relationship data between the sender and the recipient in the database is updated based on the received data package.

13 Claims, 9 Drawing Sheets

METHOD AND SYSTEM FOR PROCESSING DATA PACKAGES

CROSS-REFERENCE TO RELATED APPLICATIONS

This application claims priority to United Kingdom patent application numbers GB2204562.9 filed on Mar. 30, 2022, GB 2204563.7 filed on Mar. 30, 2022, GB 2204564.5 filed on Mar. 30, 2022, and GB 2204565.2 filed on Mar. 30, 2022 under 35 U.S.C. § 119(a). Each of the above-referenced patent applications is incorporated by reference in its entirety.

BACKGROUND OF THE INVENTION

Field of the Invention

The present invention relates to a method, system, and computer-readable storage medium for processing and analysing data packages. More particularly, determining how to handle data packages when they are received by a recipient.

Description of the Related Technology

The transmission of data packages between a sending device and a receiving device on a network may require security checks in the form of verifying senders and/or recipients to determine potentially malicious or erroneously composed messages. The data package may have several properties and/or characteristics that may aid in this determination.

Undertaking the sorts of processing that is required can be relatively time-consuming and resource-intensive. For example, analysing the properties and/or characteristics of the data packages whilst improving security and threat detection can also result in increased frustration and annoyance on the part of the user due to the increased processing times at both the sending and receiving devices.

SUMMARY

In accordance with a first aspect of the present disclosure, there is provided a method for classifying a received data package, using a framework, the framework comprising at least one classifier; a processing component for processing the received data package using the at least one classifier; and a database for storing at least relationship data indicating a plurality of relationships between a sender and at least one recipient. The at least one classifier is configured to perform the steps of obtaining header data of the received data package, the header data comprising at least user identifiers corresponding to at least the sender and the at least one recipient; obtaining data representing a relationship between the sender and the at least one recipient from the database; determining a relationship metric based on the relationship, wherein the relationship is indicative of at least a previous communication history between the sender and the at least one recipient; applying a handling action to the received data package based on the relationship metric; and updating the relationship data between the sender and the at least one recipient in the database based on the received data package.

By determining a relationship metric between the sender and recipient based on previous communications the strength of the relationship between the sender and recipient can be determined in comparison to previous communications. The data package can then be handled accordingly, as the strength of the relationship is indicative of whether the data package is likely to be trustworthy. By using the relationship metric indicative of the strength of the relationship between the sender and recipient, received data packages can be efficiently analysed quickly on receipt, and the data package can be handled accordingly. Furthermore, by updating the relationship data stored in the database, subsequent messages can be handled more efficiently and accurately.

A unique sender identifier may be determined, and the relationship metric may be based on relationship data between the unique sender identifier and the at least one recipient. This enables the quick and efficient identification of the sender, such that the respective relationship data can be obtained from the database.

Determining the relationship metric based on the communication history may be based on at least one of a frequency of transmission of data packages between the sender and the at least one recipient, a similarity in an address of the sender and an address of the at least one recipient, an elapsed time since a previous transmission of a data package between the sender and at least one recipient, and a direction of transmission of previous data packages between the sender and the at least one recipient. This enables the relationship metric to be based on several different factors, thereby increasing the accuracy of the representation of the relationship between the sender and recipient. As such, this enables the most appropriate handling action to be applied, and the relationship data to be updated so that it more accurately reflects the relationship.

The relationship metric may be proportional to the frequency of transmission of the data packages between the sender and the at least one recipient. This enables the relationship metric to be based on the frequency of transmission such that the lower the frequency the lower the relationship metric, thereby being representative of a level of trust, and vice versa.

The relationship metric may be inversely proportional to the elapsed time since the previous transmission of a data package between the sender and the at least one recipient. This enables the relationship metric to be based on the time between transmissions from a given sender such that the lower the time the higher the relationship metric, thereby being representative of a higher level of trust, and vice versa.

The relationship metric may be increased when the similarity of the address of the sender and the address of the at least one recipient is above a predetermined threshold. This enables the relationship metric to be based on the similarities between sender and recipient addresses, such that where the addresses have an increased similarity, the higher the relationship metric, thereby being representative of a higher level of trust, and vice versa.

If the direction of transmission of previous data packages is one way, the relationship metric may be limited to a predetermined ceiling value. This enables the relationship metric to be limited if messages are received from a sender and the recipient does not reply.

The relationship metric may be based on at least one of a whitelist of senders, and a blacklist of senders. This enables the relationship metric to be based on whether a sender is on a whitelist or blacklist, enabling quick and easy blocking of given senders when the relationship level falls below a threshold.

In accordance with a second aspect of the present disclosure, there is provided a system for classifying a received data package, the system comprising a user device for receiving the data package; storage for storing at least relationship data indicating a plurality of relationships between a sender and at least one recipient; and a remote server for receiving the data package from a sender. The remote server provides at least one processor configured to process the data package using at least one classifier. The at least one classifier is configured to obtain header data of the received data package, the header data comprising at least user identifiers corresponding to at least the sender and the at least one recipient; obtain data representing a relationship between the sender and the at least one recipient from the database; determine a relationship metric based on the relationship, wherein the relationship is indicative of at least a previous communication history between the sender and the at least one recipient; apply a handling action to the received data package based on the relationship metric, and update the relationship between the sender and the at least one recipient in the database based on the received data package.

In accordance with a third aspect of the present disclosure, there is provided a non-transient storage medium comprising computer-readable instructions which, when executed by a computing system, cause the computing system to perform the method described above.

Further features and advantages of the disclosure will become apparent from the following description of preferred embodiments of the disclosure, given by way of example, which is made with reference to the accompanying drawings.

DETAILED DESCRIPTION OF CERTAIN INVENTIVE EMBODIMENTS

Data packages may be sent between senders and recipients on a data network. Due to the increased number of interconnected devices, such as smartphones, laptop computers, wearable devices and desktop computers, users can access data at various physical locations, provided they have a sufficient connection to the internet. Accordingly, users may be able to send and/or receive data packages from various locations, at various times, using different devices. Being able to manage, track, and determine the devices that a user sends and receives data packages from, enables a system to make judgements as to the veracity of the sender and/or recipient, and as such determine whether additional measures need to be employed. For example, determining whether indicate to a recipient the risk of a potential threat or prevent the recipient from opening or sending a data package.

Determining the level and type of processing to apply, may comprise analysing several pieces of information, such as information relating to previous interactions between the sender and recipient, the content of the data package, and in some examples, data from additional data services.

Information relating to the sender and recipient of the data package, as well as the contents of the data package may be used as the basis for determining handling actions to apply, wherein the handling action selected is indicative of the risk associated with the given data package. For example, a high-risk data package may result in specific safeguards being put in place to prevent recipients from accessing the data package. Alternatively, if the risk score is high enough to indicate a severe risk, it may be determined that the data package should be quarantined and/or amended in such a way to negate and/or reduce at least some of the risk.

Determining the risk a given data package poses, may involve the use of different functions, and in some examples may involve machine learning functions arranged to analyse different characteristics of the data package, the sender, and the recipient. Being able to determine the risk and apply handling actions quickly and efficiently results in users not being frustrated due to the delay in receiving the data package. If they are frustrated or annoyed due to the amount of time, and lag or latency in determining the risk and providing access to the data package, or a notification of a risky data package, then this may lead them to deactivate, or simply never enable the system, and as such serve to increase the risk of a threat.

Figure 1:
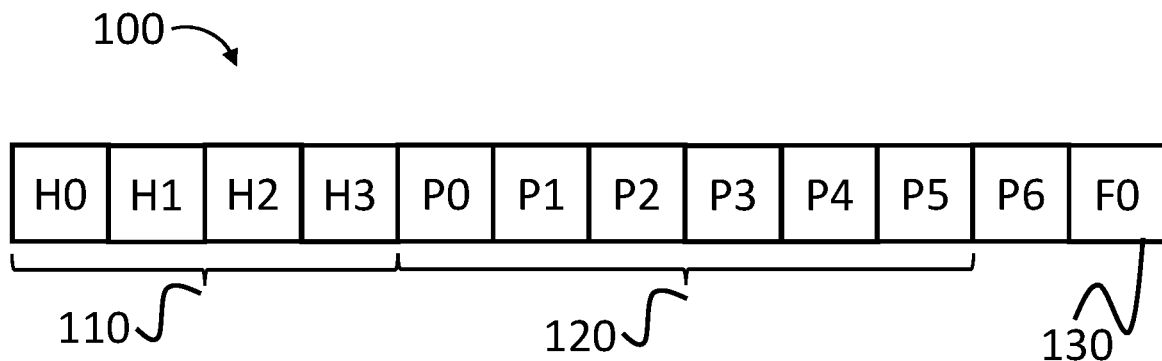
FIG. 1 is a schematic representation of an exemplary data package according to an example.

FIG. 1 is a schematic representation of an exemplary data package 100 according to an embodiment. The data package 100 comprises a header 110, payload data 120, and a footer 130, and may form part of a larger data file. The data package 100 may be an email, multimedia file, program for execution on a computing device or any other suitable data. The data package 110 may be split into a number of smaller data portions H0 . . . H3; P0 . . . P6; F0. In some embodiments, each of these portions may represent individual bits of data. Whilst the data package 100 of FIG. 1 comprises 11 data portions, it will be appreciated that the data package 100 may comprise a larger or smaller number of data portions.

The header 110 of the data package 100 may comprise information regarding the payload data, for example, the header may include data portions relating to the length of the data package 100, synchronization data, a package number, network protocols that define what type of information is contained in the payload data, a destination address, an originating address, and a location of the sender and/or recipient. It will be appreciated that other types of data portion and any combination of those data portions may be included in the header 110.

The payload 120 of the data package 100 may comprise data associated with the content to be transmitted from the sender to the recipient. For example, the payload 120 comprises data associated with an email message or multimedia file, or a combination of files such as an email with an attachment. The payload 120 may comprise at least one data portion, which as mentioned above may be representative of individual bits of data. The data portions may also represent collections of individual bits, or even different data items. For example, the payload 120 of a data package may comprise data relating to an email, and a number of attachments to the email. As such, the payload 120 need not be representative of a single data item to be transmitted from a sender to a recipient. Similarly, the payload 120 may represent a portion of a data item. For example, where the data item to be transmitted from a sender to a recipient is a large data file, such as a multimedia file, the data package 100 may represent a portion of that data file. In such examples, the header 110 may be used to indicate the order of the data packages 100 making up the large data file.

The data package 100 may also comprise a footer 130 for verifying the contents of the data package 100 on transmission. For example, the footer 130 may comprise a data portion F0 used for error checking, such as a cyclic redundancy check or other similar methods. As with the header 110 and payload 120, whilst the footer 130 is shown as a single data portion F0, it will be appreciated that the footer 130 may comprise more than a single data portion.

Embodiments of the present disclosure will now be described with reference to:
1. A framework for processing and/or analysing the data packages;
2. A normalisation and permutation scheme for classifying data packages;
3. A link-rewriting scheme for analysing and modifying data packages;
4. A reauthentication scheme for classifying data packages; and
5. A trust-bands scheme for classifying data packages.

1. The Framework

FIG. 1 shows schematically a framework 200 for processing and/or analysing data packages according to an example. The framework 200 comprises at least a processing component 220 and a classifier and/or adjuster, referred to going forward as an analysis component 230. Optionally, the framework 200 comprises a database 240 for storing data associated required during the processing and/or analysis of data packages.

The framework 200 is arranged to receive 210 a data package from a user's device. The user device may be a remote device, such as a desktop computer, mobile telephone, or other device arranged to communicate with the framework 200 via a network connection, such as via the internet, or a direct connection to a server of other computing devices capable of running the framework 200. The user device may access the resources associated with the framework 200, such as the processing component 220, via a software program such as a web browser or other application installed on the user device which facilitates the connection to the framework 200 via an application programming interface, hereinafter referred to as an API (not shown). The user may interact with the framework 200, such as by sending 250 and/or receiving 210 a data package or other actions to a recipient using the API. The API may also be arranged to send one or more other commands to/from the user device. For example, if a data package is received at the processing component 220, and it is determined that it is a potential threat then the framework 200 may send a notification to both the sender and the recipient of the outcome of the determination using the API. The API may also be responsible for initiating a particular processing and/or analysis step, such as the classification and analysis examples described below with reference to FIG. 3 through FIG. 14.

As noted above the framework 200 also comprises an analysis component 230 which may comprise at least one classifier and/or adjuster. Whilst the description below refers to this analysis component 230 comprising a single classifier and/or adjuster, it will be appreciated that the analysis component 230 may comprise multiple classifiers and/or adjusters for performing different analyses on a data package sequentially or in parallel. The analysis component 230 may be hardware-implemented or software-implemented and configured to perform a given analysis on a data package to determine one or more characteristics and based on these characteristics apply one or more handling actions.

The analysis component 230 may be configured to implement at least one of the classifiers or adjusters described below with reference to FIG. 3 through FIG. 14. In some examples, the analysis component 230 may be configured to implement multiple different classifiers and/or adjusters, and is not limited to the examples described below.

The framework 200 in some examples may also comprise storage 240. The storage 240 may be arranged to provide information useful during the processing of a data package by the processing component 220 using one or more classifiers and/or adjusters of the analysis component 230. For example, the storage 240 may be arranged to store a database comprising data models, a data set of mappings and/or relationship data as will be described with reference to the examples below.

In some examples, the framework 200 may be separate from both the sender and recipient devices, as well as being separate from other devices used during the transmission of the data package. For example, the framework 200 may operate on the remote server 540, 1140, 1440 shown in FIGS. 5, 11 and 14. In such examples, the storage 240 associated with the framework 200 may form part of the same remote server 540, 1140, and 1440, or may form part of another device such as remote storage in another server.

In other examples, the framework may be implemented using cloud computing. Cloud computing is a model for service delivery enabling on-demand network access to shared resources including processing power, memory, storage, applications, virtual machines, and services, that can be instantiated and released with minimal effort and/or interaction with the provider of the service. Cloud computing environments enable quick and cost-effective expansion and contraction of such resources by enabling the provisioning of computing capabilities, such as server time and network storage as needed. Cloud computing enables the service provider's resources to be pooled and to serve multiple consumers by dynamically assigning and reassigning physical and virtual resources on demand. Examples of such services include Amazon Web Services™ (AWS), Microsoft Azure, and Google Cloud Platform.

Services delivered using a cloud computing environment are often referred to as a Software as a Service (Saas). The applications are accessed from various client devices through a basic interface, such as a web browser. A user of the application generally has no control or knowledge over where the provided resources are located or in some examples where multiple service providers are used, which service provider is providing the resources; access to the resources of the cloud computing environments is provided via a user account object which facilitates the user's interaction with the resources allocated to a given task within the cloud computing environment. Whilst a cloud computing environment is one of the configurations capable of implementing the framework 200, it will be appreciated that other environments may be used, such as a collection of servers within a local area network (LAN).

In the examples described below the framework 200 may be provided as a service to one or more user devices configured to implement the schemes described.

2. Normalisation and Permutation

Figure 2:
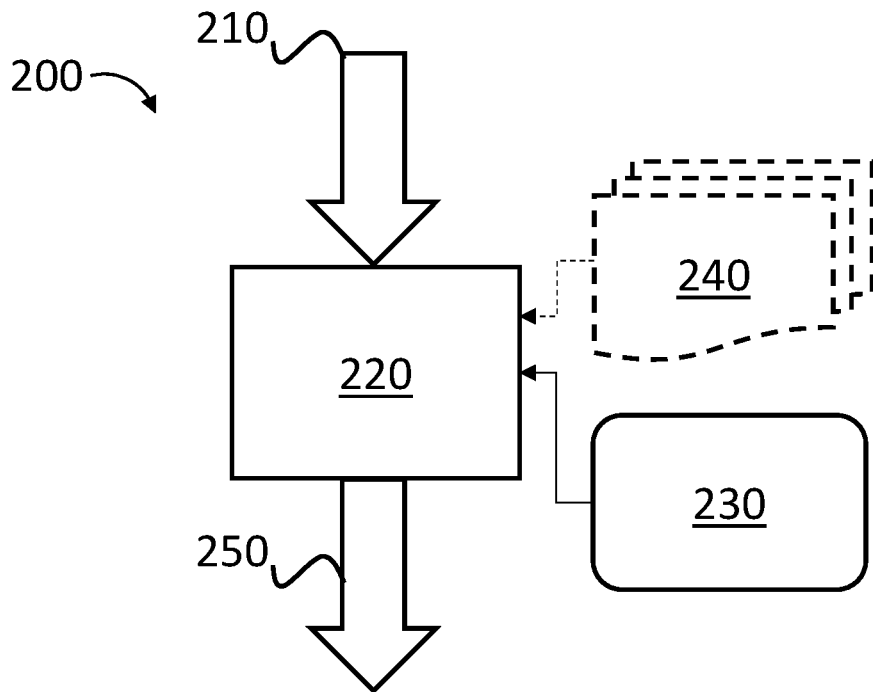
FIG. 2 is a schematic representation of an exemplary framework according to an example.
Figure 3:
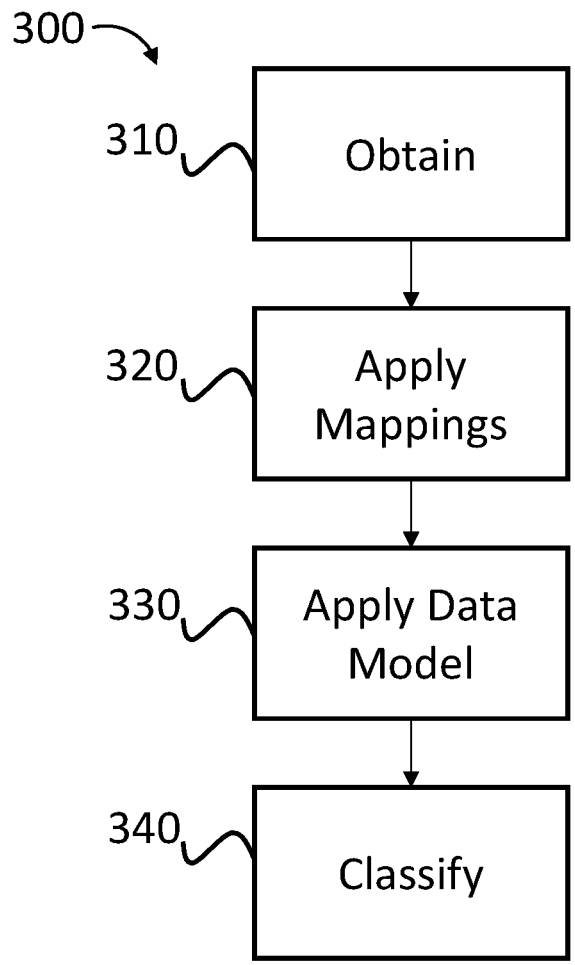
FIG. 3 is a flowchart showing a method for classifying a data package using the exemplary framework of FIG. 2, according to a first example.

FIG. 3 is a flowchart showing a method 300 for classifying a received data package using a framework, such as framework 200 described above with reference to FIG. 2. The classification scheme described in relation to method 300 is one of normalisation and permutation, whereby data in the data package is analysed efficiently by modifying the data within the data package to produce a general search term that can be used to identify common errors or modifications introduced into data packages, some of which may be introduced maliciously. This classification can then be used to indicate to a recipient that the data package is malicious and/or a handling action may be applied to the data package to prevent certain actions. The classification scheme described may be implemented via a request from a receiving device to the framework using an API as described above. The method 300 will be described below with reference to the examples 400, 450 shown in FIGS. 4a and 4b.

At step 310, data of the data package sent from a sender to a recipient, such as the data package 100 described above with reference to FIG. 1, is obtained. As mentioned above, the data package 100 may comprise header data 110, payload data 120, and footer data 130. At item 310, the data obtained may be any of the portions of data in the data package 110, however, for the purposes of explanation, the data obtained in the example described below is the payload data 120 of the data package 120. It will be appreciated that the method described can be applied to the header data 100 and the footer data 130 in a similar manner. One such example of a data package is an email, whereby the payload data 120 is the body of the email, including any attachments.

Figure 4A:
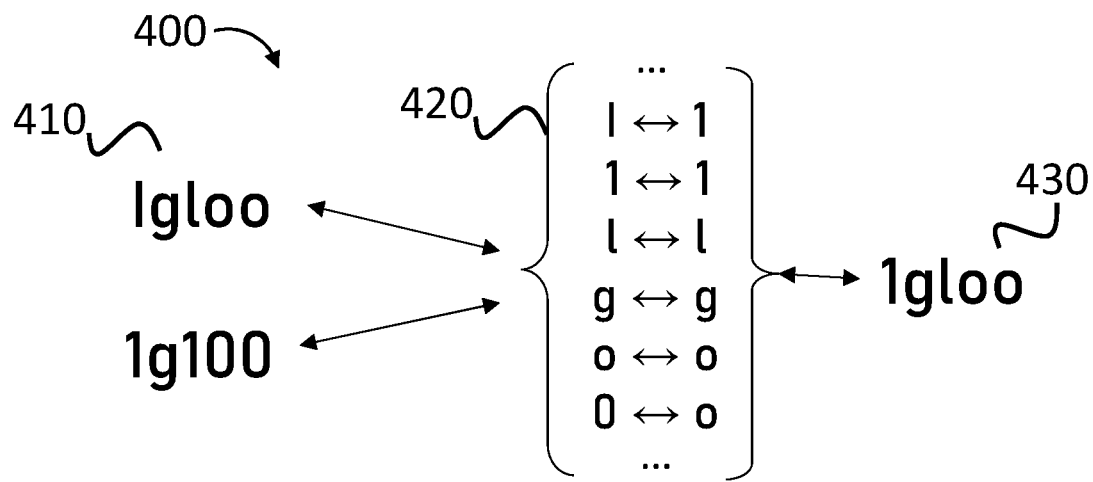
FIG. 4a is a first exemplary representation of the processing of a data package in accordance with the method of FIG. 3.
Figure 4B:
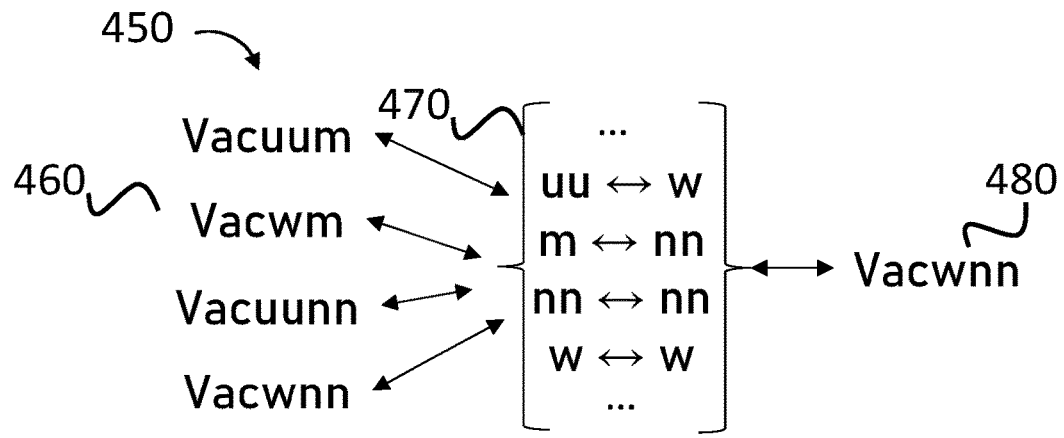
FIG. 4b is a second exemplary representation of the processing of a data package for classification in accordance with the method of FIG. 3.

Once the data of the data package has been obtained the method proceeds to step 320, where a data set of mappings is applied to the data. FIGS. 4a and 4b show two examples 400, 450 of the application of the data set of mappings. In the first example 400 shown in FIG. 4a, the data, is text data representing the word 'Igloo'. The data, such as the body of an email, may contain this word, however, in some examples, the word may be obfuscated such that it looks like the word Igloo, but instead is amended to something malicious. Whilst the example given is somewhat innocuous, it will be appreciated that similar techniques/obfuscations may be utilised to inflict greater harm on a recipient, such as the obfuscation of an email address or hyperlink within the body of an email message, which may provide the opportunity for a recipient to access malicious content.

Example 400 shows the application of a data set of mappings 420 for an input word 410; representing visually similar words to the desired word. In example 400, the input word 410 is a word that is visually similar to 'Igloo'. To manage the subsequent classification more efficiently, as will be described below, it may be beneficial for these input words 410 to map onto a single output keyword 430 which can be used during the classification process. To do this each character within the input word may be mapped using the data set of mappings 420, to the same or an alternative character.

The data set of mappings 420 contains a list of characters and their respective mapped characters. For example, the data set of mappings 420 maps an 'I' to a '1', and 'l' to itself, an 'o' to itself, and a '0' to an 'o'. It will be appreciated that the data set of mappings 420, may contain a number of other character mapping pairs including but not limited to those described below in relation to the data set of mappings 460 described with reference to example 450. In other examples, there may be multiple different data sets of mappings comprising different common character mappings. In such examples, the data set of mappings may be based on the sender and/or the recipient along with other features of the data package, such as the data package type and/or content. This enables the different data sets of mappings to be chosen based on the characteristics of the data package thereby providing more accurate and, in some examples, context-sensitive, mapping of characters within the data package.

The data set of mappings 420 is applied to the input word 410 and an output word 430 is produced. By using the same data set of mappings 420, a number of different input words 410 can be mapped to the same output word 430 thereby ensuring that any number of different obfuscations applied by the sender can be recognised during the classification process. In example 400, both the input words 'Igloo' and '1g100' which are visually similar are mapped to the output word 430 'Igloo' using the data set of mappings 420.

Turning to the example 450 shown in FIG. 4b, the data set of mappings 470 comprises a number of other character mappings, including single to double and double to single character mappings, such as 'uu' to 'w' and 'm' to 'nn'. As mentioned above, these character mappings may form part of the same data set as the data set of mappings 420 described with reference to example 400. In other examples, they may form part of a separate data set specific to the sender and/or the recipient, or even form part of a data set of mappings comprising multiple-to-single character mappings or multiple-to-multiple character mappings. In example 450, a number of input words 460 visually similar to the word 'Vacuum' have the data set of mappings 470 applied and produce the output word 480 'Vacwnn'. As the same data set of mappings 470 is applied to all the inputs then they all produce the same output word 480, 'Vacwnn', thereby making any subsequent classification more efficient since there is no need to check/classify each of the different visually similar variations.

Whilst the examples of data sets of mappings 420, 470 shown indicate those of visually similar characters or groups of visually similar characters, it will be appreciated that characters may have a different machine-readable format to the format which they may appear in a user interface of a recipient's device.

Similarly, whilst examples 400, 450 described above show a single use of a data set of mappings 420, 470, it will be appreciated that a data set of mappings 420, 470 may be applied multiple times, for example sequentially. These additional applications of the data set of mappings may occur before or after the permutation step described below with reference to step 330. The data set of mappings 420, 470 may be the same data set of mappings or may be a different data set of mapping for each stage. For example, as shown in example 450, the input word 460 'Vacuunn' is mapped to the output word 480 'Vacwnn' by applying the data set of mappings 470. The output word 480 may then act as an input word to a second stage where the same or a different data set of mappings may be applied. For example, a data set of mappings (not shown) comprising the mapping {w→vv} may be applied to the output word 480 of the first stage, such that 'Vacwnn' is then mapped to 'Vacvvnn'.

Furthermore, it will be appreciated that whilst the examples 400, 450 described above relate to alphanumerical sequences of characters in the English language, other sequences of characters, in other languages may be mapped using the same technique and a data set of mappings based on the characteristics of the data package. The languages are not limited to spoken word language but may also apply to computer programme code, such as HTML or other programming languages. This enables the data package to be analysed, and common output words to be produced whereby the data set of mappings is tailored to the programming language used.

The output words produced by the application of the data set of mappings is representative of normalised data which can be used more efficiently during classification, such as the permutation step described below.

Returning to FIG. 3, once the data set of mappings has been applied to the data obtained from the received data package to produce normalised data, at step 330 a data model is applied to the normalised data. The data model is used to generate at least one permutation of the normalised data. The data model is used to add and/or subtract characters from the normalised data thereby producing a permutation. Following on from example 400 of FIG. 4a, one possible permutation of the output word 430 'Igloo' may be the addition or subtraction of an 'o'. As such, the output of the application of the data model may be the set {'Igloo'|'Iglooo'|'1glo'}. Whilst in this example characters may be added and/or subtracted to the input words, it will be appreciated that other amendments to the input words may also be detected and analysed using the data model.

By checking for additional characters added to the input word, characters that are not visible to the recipient of the data package may be detected. For example, some of the additional characters in the data package may have a zero font size, and as such are not visible by the recipient. By checking for these additional characters input words that look innocuous but are in fact malicious can be detected and handled/classified accordingly. This can be particularly dangerous when the input word is representative of a URL or other user interactive content: the URL may appear to be correct to the recipient, but due to the presence of so-called 'invisible' characters, the user is in fact directed to malicious content.

The data model may comprise a plurality of different methodologies for determining the additions and/or subtractions made to the normalised data. For example, the data model may comprise a dictionary of words, one or more regular expressions, natural language processing techniques amongst others to determine likely additions and/or subtractions to be made to a given input word.

As mentioned above, the data model and the data set of mappings may be stored in storage associated with the framework. The data model and data set of mappings may also be periodically updated, for example on the receipt of a data package or at predetermined times and/or periods. Thus, the data model and the data set of mappings are kept up-to-date and can detect the most common and/or recent malicious amendments made to data packages. This may be achieved by feeding back the outputs words and updating one or more strings of characters stored in the data set of mappings in the database or revising the data model by updating the dictionary and/or regular expressions.

Once the permutations have been generated the method 300 proceeds to step 340 whereby the data package is classified. The data package is classified based on the permutations of the normalised data. This may be undertaken by detecting whether a given output is likely to be malicious, such as whether the data in the data package is representative of a known security risk. As each of the input words have been normalised and the different permutations determined, a more efficient means of classifying the data package is available since there is no need to check each and every possible permutation of every different visually similar input word. Instead, the permutations of the normalised data can be checked. They may be checked using a data model, such as the data model described above, or via a different means such as a database or dictionary of known malicious content, such as links representing a known security risk.

As mentioned above, in some examples, before the classification of the data package, one or more additional normalisation and/or further permutation steps may be undertaken to refine the results so that a more efficient classification can be undertaken.

Optionally once the data package has been classified a handling action can be applied. For example, if the data package is classified as a malicious data package then the user may be notified of the fact, and the data package quarantined whilst the recipient determines an action to take, such as receiving the data package or reporting it. If the data package is classified as harmless, then the data package may be forwarded to the recipient without warning. It will be appreciated that the classification may be performed with regards to a scale, whereby the level of risk can be at any point from harmful to harmless depending on the output of the classification. In such an example, an indication of the potential harm (or lack thereof) may be provided to the recipient, such as by a banner or indication on a scale.

Figure 5:
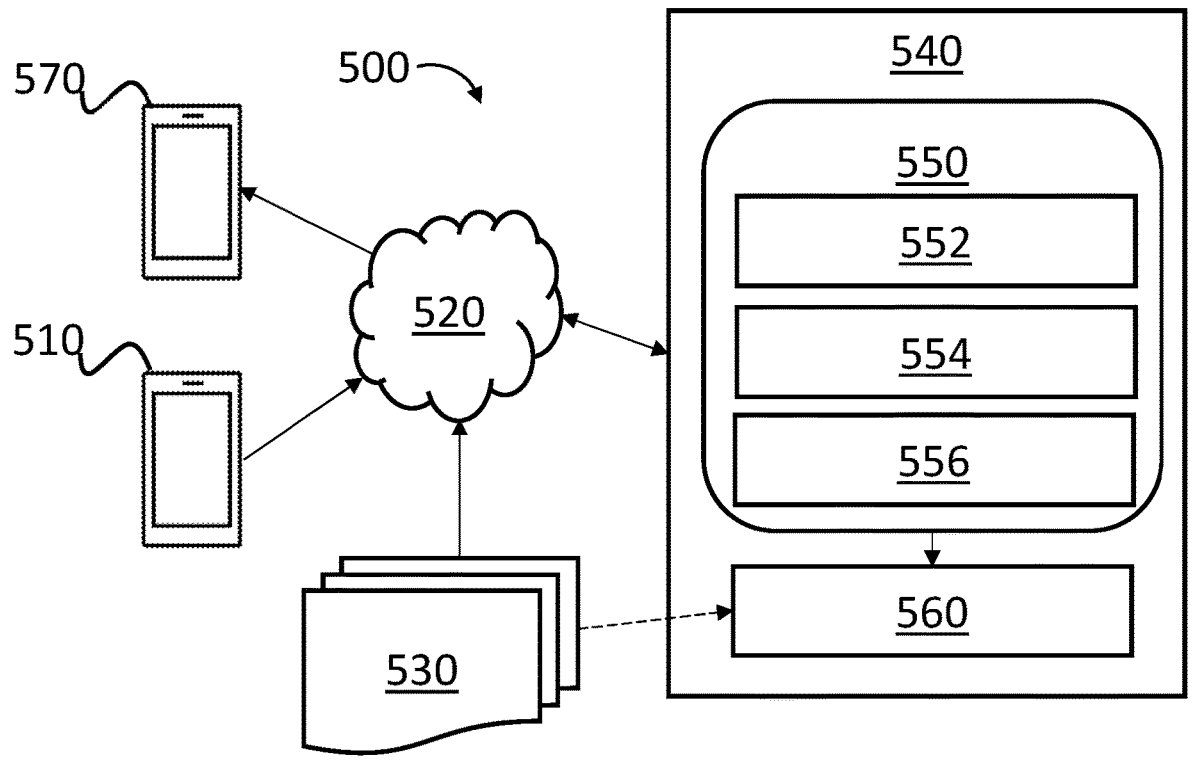
FIG. 5 is a schematic representation of a system for classifying a data package according to the first example.

FIG. 5 shows a system 500 comprising hardware components configured for operating a framework, such as framework 200 described above in relation to FIG. 2, for classifying data packages in accordance with the method 300 described above with reference to FIG. 3. The system 500 comprises at least one sending device 510 and at least one recipient device 570. The sender and recipient devices 510, 570 may be any suitable device for sending and/or receiving data packages. For example, the sender and recipient devices 510, 570 can be a mobile telephone, hand-held or laptop device, a desktop computer, a multiprocessor system, a microprocessor-based system, or a programable consumer electronic device comprising appropriate transmitting and/or receiving capabilities. To facilitate the transmission and/or receiving capabilities, the sender and recipient devices 510, 570, may comprise a network adaptor (not shown) that is arranged to facilitate communication with any number of remote resources via a network 520 such as a local area network (LAN), a general wide area network (WAN), and/or a public network (e.g. the Internet). The network adaptor may be configured to communicate using either a wired or wireless communication method, such as cellular connectivity (LTE, 3G, 4G, or 5G), ethernet, or over a Wi-Fi network. It will be appreciated that other types of sender and recipient devices 510, 570, and transmitting and/or receiving capabilities may be used.

The system 500 also comprises storage 530 for storing at least the data set of mappings and the data model for use by the classifier as described above in relation to method 300. The storage 530 may be a solid-state drive (SSD) or other semiconductor-based RAM; a ROM, for example, a CD ROM or a semiconductor ROM; a magnetic recording medium, for example, a floppy disk or hard disk; optical memory devices in general, although it will be appreciated that other storage mediums may be used. The storage 530 may be accessed via a local area LAN, a WAN, and/or a public network (e.g. the Internet) via a network adaptor. The network adaptor may be configured to communicate using either a wired or wireless communication method, such as cellular connectivity (LTE, 3G, 4G, or 5G), ethernet, or over a Wi-Fi network. Whilst the storage 530 is shown as separate from the other resources of the system 500, it will be appreciated that the storage 530 may form part of the remote server 540, or maybe a virtual component associated with a cloud computing implementation of the system 500. In yet further examples, the storage 530 may be located on another server in a different location to the remote server 540. Whilst the example system 500 shown in FIG. 5 shows the storage 530 interacting with the remote server 540 via a network connection, it will be appreciated that the storage 530 may interact with the remote server via a direct connection as indicated by the dotted arrow.

The system 500 comprises a remote server 540 which may be implemented in hardware, or maybe an AWS server or other server provided by a cloud services provider; furthermore, multiple remote servers may be used, each being provided by separate cloud computing service providers to provide the services required to implement the method 300 described above. The remote server 540 may be configured on the same network as the sender and recipient devices 510, 570, or alternatively may be accessed via an external network such as the internet. It will be appreciated that the remote server 540 may be on the same network as at least one of the sender or recipient devices 510, 570, for example where the remote server belongs to an organization's network and the recipient and/or sender are part of that organization connecting to the organization's network using their respective devices. The sender and recipient devices 510, 570 may interact with the remote server 540 using an API (not shown) as described above in relation to FIG. 2. The API is arranged to send and/or receive commands and data between the sender and recipient devices 510, 570, and the remote server 540.

The remote server 540 comprises at least some of the components of the framework 200 described above for implementing the method 300. In particular, the remote server 540 comprises a processor 560 for receiving a data package from the sending device 510 and data, such as the data model and data set of mappings from storage 530. The data may be received directly from the storage 530 as indicated by the dotted arrow or may in some embodiments be received via the network 520. The processor 560 uses the classifier 550 to process the received data package and classify the data package before forwarding the processed data package, or an indication of the outcome of the classification such as a notification, to the recipient device 570.

The classifier 550 comprises a number of modules 552, 554, and 556 arranged to implement the method 300 described above. These modules 552, 554, 556 may be hardware-implemented or software-implemented and configured to implement at least some of the steps described above with reference to method 400. The classifier 550 comprises at least:

a first application module 552 arranged to apply the data set of mappings and generate normalised data;

a second application module 554 arranged to apply the data model to the normalised data and generate at least one permutation of the normalised data; and a classification module 556 arranged to classify the data package based on at least one permutation of the normalised data.

In examples where the remote server 540 is implemented in a cloud computing environment the classifier 550 may be implemented in a virtual private cloud and arranged to process the data package using a software-implemented representation of each of the modules 552, 554, 556 described.

3. Link Rewriting

Figure 6:
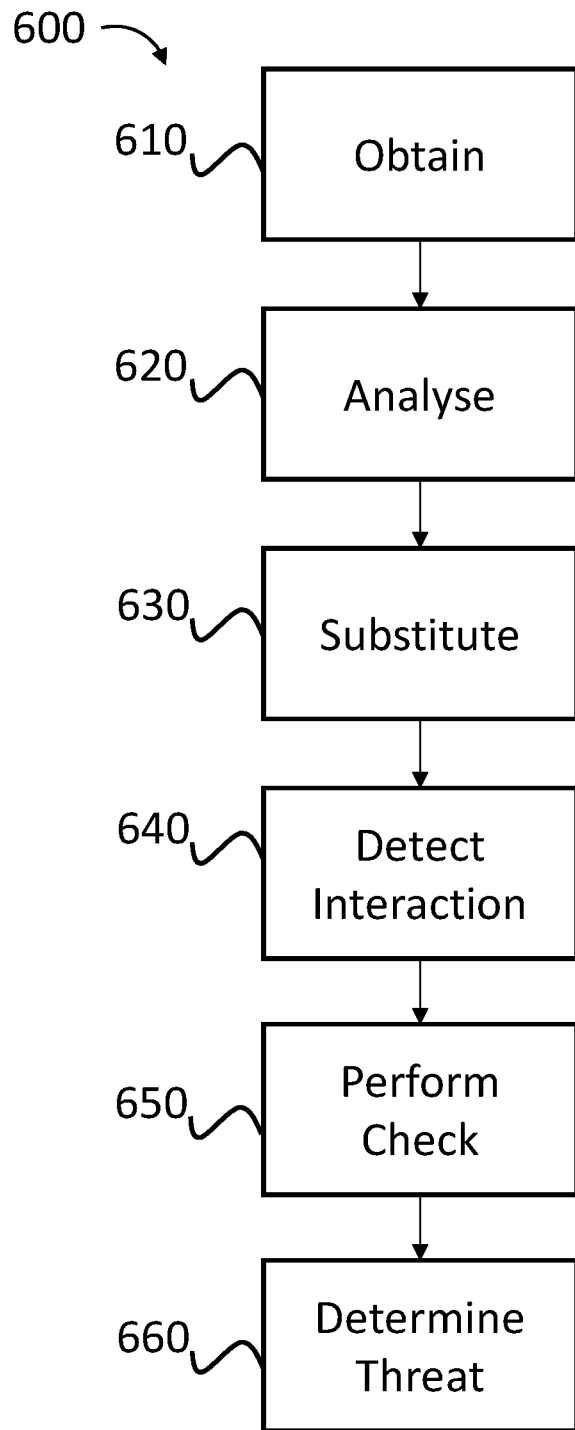
FIG. 6 is a flowchart showing a method for analysing a data package using the exemplary framework shown in FIG. 2, according to a second example.

FIG. 6 is a flowchart showing a method 600 for analysing a received data package using the framework 200 described above with reference to FIG. 2. The analysis scheme described in relation to method 600 is one of link re-writing, whereby data in the data package is analysed and modified to re-write links within the data package such that they can be analysed when a recipient interacts with them. The re-writing enables the recipient to be redirected to alternative content if it is determined that the unamended link would otherwise direct the recipient to malicious content. The analysis scheme described may be implemented via a request from a receiving device to the framework using an API as described above. The method 600 will be described below with reference to example 700 shown in FIGS. 7a and 7b.

At step 610, the data package sent from a sender to the recipient, such as data package 100 described above with reference to FIG. 1, is obtained. As mentioned above the data package 100 may comprise header data 110, payload data 120, and footer data 130. At item 610 the data obtained is the payload data 120 in the data package 110, one such example of a data package is an email, where the payload data 120 is the body of the email.

Figure 7A:
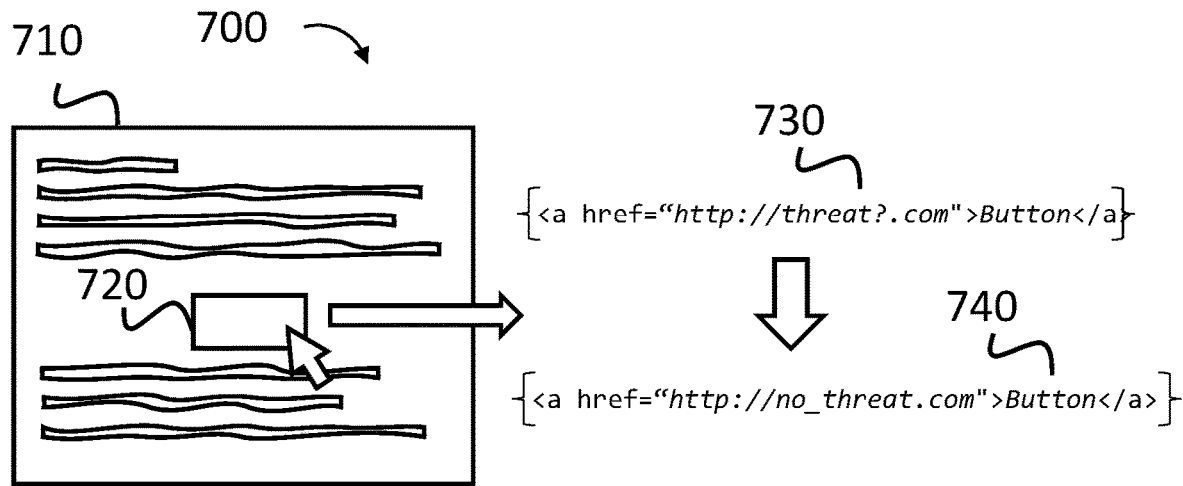
FIG. 7a is a first exemplary representation of user interaction with a data package analysed by the method of FIG. 6.

Once the payload data of the data package has been obtained the method proceeds to step 620, where the payload data is analysed to determine whether it comprises recipient-interactive content. Examples of recipient-interactive content include hyperlinks, videos, or other objects which enable a recipient to interact with their content. It will be appreciated that there are any number of other types of recipient-interactive content. The analysis, in particular, focuses on recipient-interactive content that provides a link to remote content such as an external web page although links to other types of content stored remotely from the recipient may be used. FIG. 7a shows an example email 710 which contains a button 720 for a recipient to click. The example shows the HTML code 730 for the button when the email is received. The analysis step 620 parses through the HTML code and detects the "<a href= . . . >" HMTL tag. The HTML tag links to remote content, in this case, the website address "http://threat?.com". As set out above, it will be appreciated that other examples of recipient-interactive content may be used and that the remote content need not be accessed directly by the recipient clicking on a button. Furthermore, it will be appreciated that embodiments are not limited to HTML content, but any content received by a recipient. For example, the remote content may be an image or other media file stored remotely that is loaded and facilitates recipient interaction.

Following the analysis, the method 600 proceeds to step 630 where the recipient interactive content is substituted with sanitised recipient interactive content. The sanitised interactive content is configured so as to prevent the recipient from accessing remote content which may be potentially harmful. In some examples, the sanitised recipient interactive content may be identical to the recipient interactive content in the data package. In other embodiments, the sanitised recipient interactive content may differ from the recipient interactive content to indicate to the recipient that the link has been replaced.

FIG. 7a shows an example of the replacement, whereby an email 710 comprises HTML content which includes a button 720 for the recipient to click, as explained above. The HTML code 730 for the button, when obtained at step 610 as described above, includes a link to remote content, in this case, the website "http://threat?.com". The analysis step 620 described above detects this HTML code 730 in the HTML code of the body of the email 710 and at step 630 the HTML code 730 is substituted for sanitised HTML code 740. In this example, the sanitised HTML code 740 links to the sanitised remote content, "http://no_threat.com". Whilst generic links are shown, it will be appreciated that the analysis step 620 may detect a number of known threats, such as blacklisted websites. In some examples, other techniques and schemes described throughout this document may be used to indicate whether a particular link contained in a received data package is a potential threat. Similarly, whilst a generic link is used to represent the link to the sanitised recipient interactive content, other examples may be used such as a link to remote content where further checks are undertaken. Such remote content may be provided as a software as a service to multiple clients and provide feedback to recipients regarding the data package and the associated threats, whether potential or actual.

Once the recipient-interactive content within the data package has been substituted for sanitised recipient-interactive content, the data package may be made available to the recipient. In example 700, this may involve presenting the email to the recipient via their email program or web browser. At step 640 of the method 600, recipient interaction with the sanitised recipient-interactive content 740 is detected. For example, this may involve the recipient clicking on a link, such as the button 720, in the email. However, it will be appreciated that the recipient interaction may be any other type of interaction, including but not limited to detecting one or more interaction events, such as a mouse-over, mouse-out, keyboard input, or any other indicator that the recipient has made some form of interaction with the content of the data package, in particular the recipient interactive content of the data package.

Figure 7B:
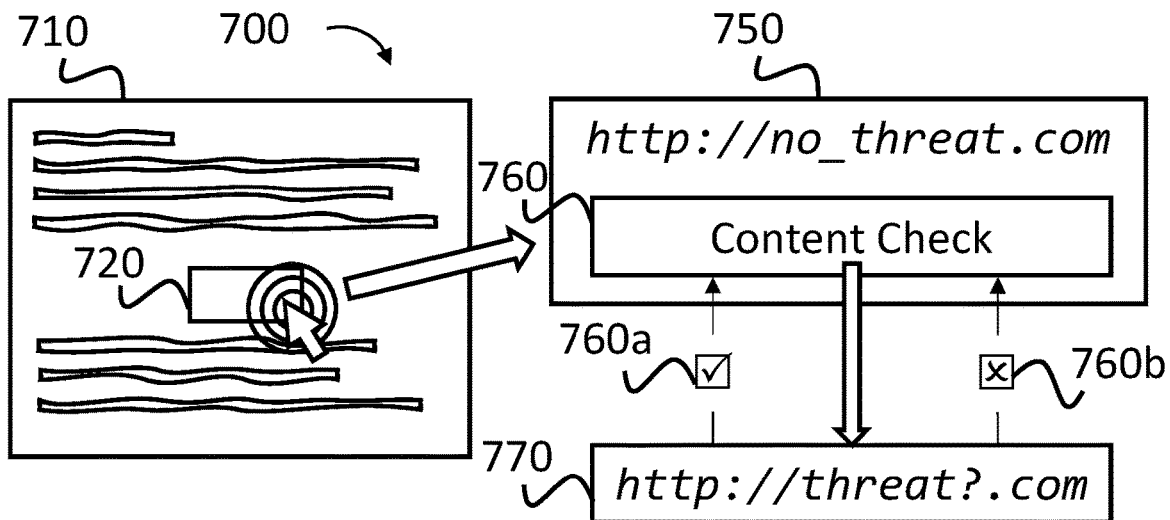
FIG. 7b is a second exemplary representation of user interaction with a data package analysed by the method of FIG. 6.

Once the interaction with the sanitised recipient interactive content has been detected, at step 650, a content check, such as content check 760 in FIG. 7b is performed. The content check may take many forms and as mentioned above may include analysing the remote content linked to by the recipient-interactive content. Continuing the example 700 described above with reference to FIG. 7a, when a recipient clicks on button 720, they are directed to the web address represented by the sanitised recipient-interactive content, in this case, "http://no_threat.com". At this web address, an analysis of the original recipient interactive content is undertaken by performing a content check. The content check 760 will comprise performing one or more operations and analysis on the remote content 770, in this case, the web address "http://threat?.com". Whilst the example described above refers to the use of web addresses and websites for performing the check as previously mentioned the replacement and checking of the content may be performed by a cloud computing system provided as part of a Software as a Service product.

The content check 760 may involve performing a number of different operations based on the remote content 770. In some examples, during the initial analysis at step 620, the remote content 770 may be analysed. This initial analysis, therefore, provides a representation of the remote content 770 when the data package was received by the recipient. As the content check 760 is performed when the recipient actually interacts with the sanitised recipient interactive content—that is the data package will have been received at that stage and the recipient interactive content replaced with a sanitised version-a second analysis of the remote content 770 can be undertaken at this later time. The results of the second analysis may be compared to the results of the initial analysis and a difference between the two can be determined. This can be used to determine whether the remote content 770 has one or more features that are time-sensitive, and can therefore detect and warn recipients of threats that may change depending on the time which the remote content is actually accessed. This may be a binary check, that is any difference between the initial and second analysis will flag a potential threat to the recipient, or there may be a threshold amount of change which is acceptable, and as such minor differences between the initial and second analysis may not result in the data package being flagged as a potential threat.

The content check 760 may also comprise applying a geographical check to the remote content 770, whereby the location of the remote content is determined. This check and along with other features of the data package can be used to determine whether the location is what would be expected based on previous data packages and other data accessible by the method. For example, data associated with previously analysed data packages may be obtained from a remote server and used during this comparison.

Another type of content check 760 which may be applied to the remote content includes a hygiene check. This involves analysing the remote content 770 itself and detecting whether there is a likely threat. One such example of the analysis may be the application of a method similar to the normalisation and permutation method described above, which is used to detect hidden or obfuscated threats within data packages, in this case, the remote content 770. It will be appreciated that other types of hygiene checks may be performed.

Similar to the hygiene check described above, the content check 760 may involve applying a linguistic and contextual check/analysis on the remote content 770 itself. This may be used to determine phrases, keywords, and/or other features of the remote content which are associated with known threats. In addition, the content check 760 may also determine whether the remote content 770 itself is on a blacklist of content and indicate whether the remote content 770 is likely to be a threat.

Returning to method 600 of FIG. 6, at step 660, it is determined based on the results of the content check 760 whether the remote content 760 is a security or other threat. As mentioned above, the content check 760 accesses the remote content 770 and the result of the checks provide an indication 760*a*, 760*b* as to whether the remote content 770 is a likely threat. Multiple content checks 760 may be applied to the remote content depending on the requirements and security settings of the recipient and/or their organisation. As such, the results of the content check(s) used to determine whether the remote content 770 is a likely threat may be based on an aggregate of the results 760*a*. 760*b* resulting from the checks, and when the aggregate is above a given threshold it may be determined that the remote content 770 is a threat.

In some examples, based on the determination at step 660 one or more actions may be undertaken. If it is determined that the remote content 770 is a threat, then the recipient may be notified of this and prevented from accessing the remote content 770 or given an option as to whether to proceed. In another example, where it is determined that the remote content 770 is not a threat, then the recipient may be forwarded to the remote content 770.

Figure 8:
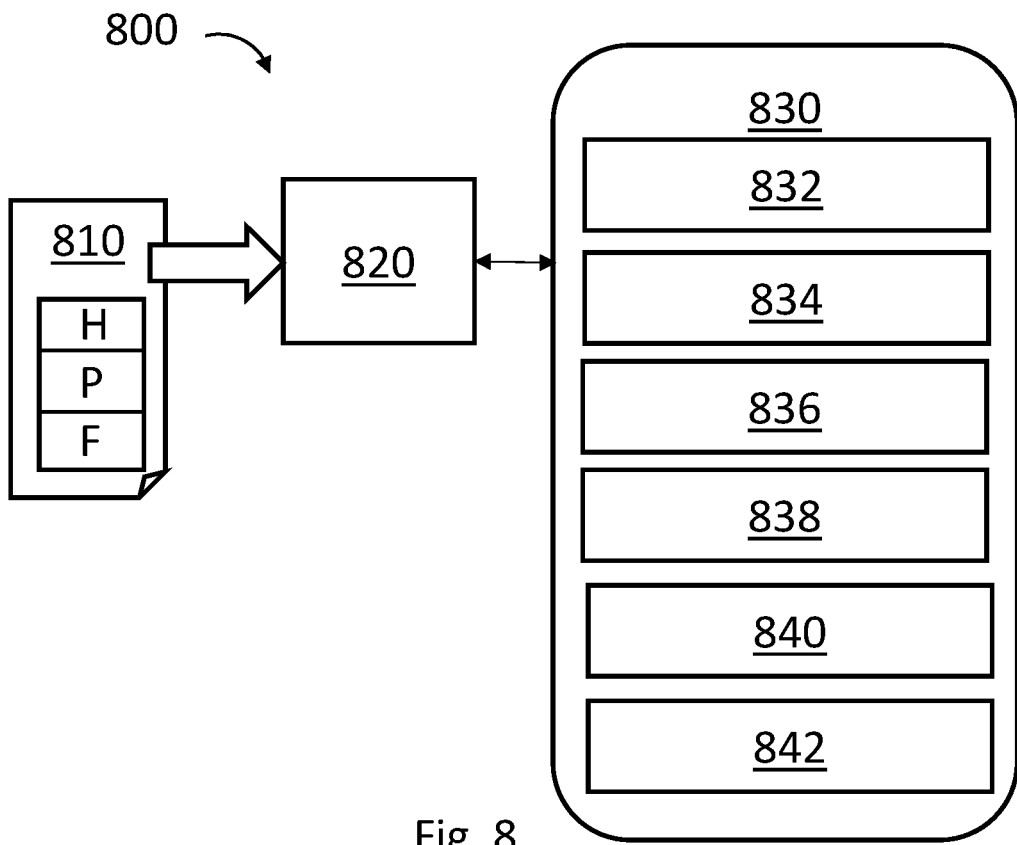
FIG. 8 is a schematic representation of a system for analysing a data package according to the second example.

FIG. 8 shows a device 800 comprising hardware components. The hardware components may be configured for operating a framework, such as framework 200 described above in relation to FIG. 2. The framework 200 is arranged for analysing received data package 810 using an adjuster 830 in accordance with the method 600 described above with reference to FIG. 6. The device 800 may be any suitable device for sending and/or receiving data packages. For example, the device 800 can be a mobile telephone, handheld or laptop device, a desktop computer, a multiprocessor system, a microprocessor-based system, or a programable consumer electronic device comprising appropriate transmitting and/or receiving capabilities. To facilitate the transmission and/or receiving capabilities, the device 800 may comprise a network adaptor (not shown) that is arranged to facilitate communication with any number of remote resources via a network (not shown) such as a local area network (LAN), a general wide area network (WAN), and/or a public network (e.g. the Internet). The network adaptor may be configured to communicate using either a wired or wireless communication method, such as cellular connectivity (LTE, 3G, 4G, or 5G), ethernet, or over a Wi-Fi network. It will be appreciated that other types of device 800 and transmitting and/or receiving capabilities may be used.

The device 800 may also comprise storage (not shown) for storing data used during the analysis, such as the outcomes of previous content checks. In some examples, the device may have access to remote storage (not shown) via the network adaptor. The storage may be a solid-state drive (SSD) or other semiconductor-based RAM; a ROM, for example, a CD ROM or a semiconductor ROM; a magnetic recording medium, for example, a floppy disk or hard disk; optical memory devices in general, although it will be appreciated that other storage mediums may be used. As mentioned above, the storage may be accessed via a local area LAN, a WAN, and/or a public network (e.g. the Internet) via a network adaptor. The network adaptor may be configured to communicate using either a wired or wireless communication method, such as cellular connectivity (LTE, 3G, 4G, or 5G), ethernet, or over a Wi-Fi network.

The device 800 comprises at least some of the components of the framework 200 described above for implementing the method 600. In particular, the device 800 comprises a processor 820 for receiving a data package 810 from a sending device (not shown. The data package 810 may be of the format of data package 100 described above and comprise a header 110, H, payload 120, P, and footer 130, F. The processor 820 is arranged to analyse the payload P data of the data package 810 using an adjuster. The adjuster may be stored in storage of the device 800 or in remote storage and is arranged to analyse the received data package 810 and any associated remote content when the data package 810 is received at the device 800 using the adjuster 830. The adjuster 830 is also arranged to detect recipient-interaction via a user interface of the device 800 and perform a content check to determine whether the remote content linked in the data package 810 is representative of a threat. In some examples, the processor 820 will receive the output of the adjuster 830 and perform an action based on the result of the analysis undertaken. For example, the processor could forward the recipient to the remote content, displaying the remote content in the user interface of the device 800 or may present a warning in the user interface, to the recipient when it is determined that the remote content is a threat.

The adjuster 830 comprises several modules 832, 834, 836, 838, 840 arranged to implement the method 600 described above. These modules 832, 834, 836, 838, 840 may be hardware-implemented or software-implemented and configured to implement at least some of the steps described above with reference to method 700. The adjuster 830 comprises at least:

- an input module 832 arranged to receive/obtain a data package 810 from a sending device, possibly via the network adapter;
- an analysis module 834 arranged to analyse the payload data P of the received data package 810 for recipient-interactive content, such as buttons, hyperlinks, and other interactive media, where the recipient-interactive content provides access to remote content;
- a substitution module 836 arranged to substitute the recipient-interactive content with sanitised recipient-interactive content, which provides access to a content check for determining the likelihood of any threat associated with the remote content;
- a detection module 838 for detecting recipient interaction via the user interface of the device 800, such as detecting a mouse click, touch event, and/or keyboard input associated with the recipient-interactive content;
- a content check module 840 arranged to perform one or more content checks on the remote content, such as those described above with reference to method 600 and example 700, when the recipient interaction is detected by the detection module 838; and
- a determination module 842 arranged to determine based on the results of the content check whether the remote content represents a security threat.

In some examples, the adjuster 830 may also comprise other modules, such as an output module (not shown) for providing an indication and/or notification to the recipient, possibly via the user interface of the device 800, when it is determined that the remote content is a security threat. The output module may also be arranged to forward the recipient to the remote content when it is determined that the remote content is not a security threat.

4. Reauthentication

Figure 9:
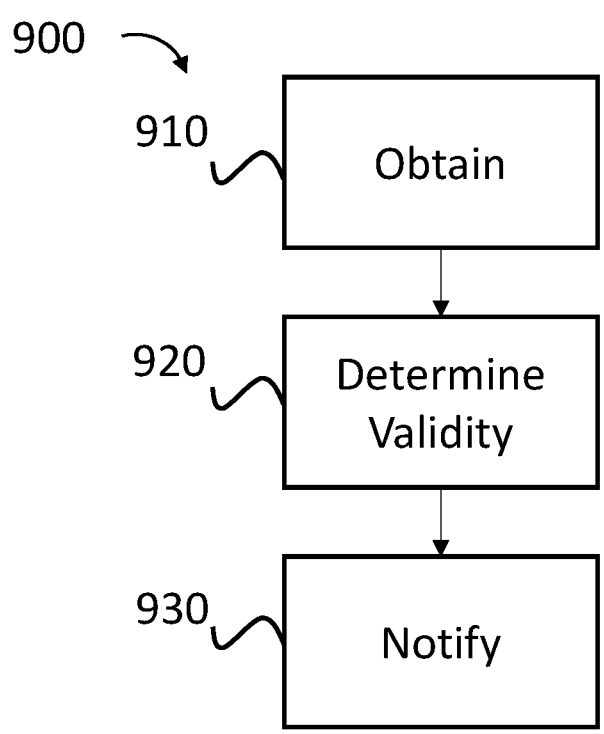
FIG. 9 is a flowchart showing a method for classifying a data package using the exemplary framework of FIG. 2, according to a third example.

FIG. 9 is a flowchart showing a method 900 for classifying a received data package using the framework 200 described above with reference to FIG. 2. The classification scheme described in relation to method 900 is one of reauthentication, whereby the header data of a data package, such as header data 110 of data package 100 described in relation to FIG. 1 above, is analysed and the validity of a transmission chain in the header data is checked, and in some examples corrected. This classification can then be used to indicate to a recipient whether the data package is malicious and/or a handling action may be applied to the data package to prevent certain actions. One example of such an action, as will be described in further detail below, includes the correction of the transmission chain in the header data before forwarding it to the recipient. The classification scheme described may be implemented via a request from a receiving device to the framework using an API as described above. The method 900 will be described below with reference to the examples 1000 and 1050 shown in FIGS. 10a and 10b.

Figure 10A:
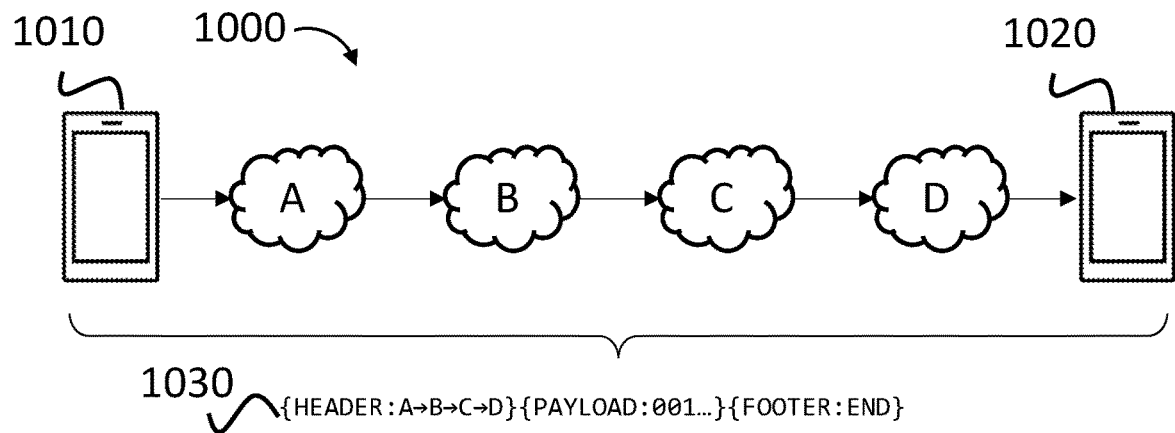
FIG. 10a is a first exemplary representation of the processing of a data package in accordance with the method of FIG. 9.
Figure 10B:
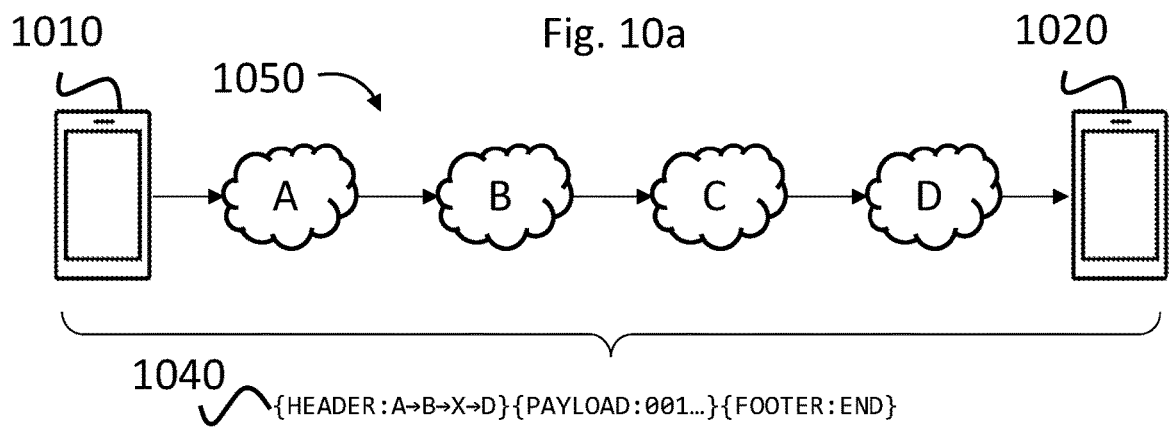
FIG. 10b is a second exemplary representation of the processing of a data package in accordance with the method of FIG. 9.

At step 910 the header data of the data package sent from a sender to the recipient such as the header data 110 of data package 100 described above with reference to FIG. 1 is obtained. One such example of a data package is an email, whereby the header data 110 is the header data of the email that contains information such as the time the email was sent, sender address, recipient address and a transmission chain. Exemplary transmission chains, in the header portions of data packages 1030 and 1040, are shown in FIGS. 10a and 10b. It will be appreciated that the header data may comprise other information.

The transmission chain contained within obtained header data for a given data package may be representative of at least the path the data package took from the sender to the recipient. For example, the transmission chain may represent one or more redirects between servers when the data package is transmitted from the sender to a recipient. A complete transmission chain is one where the path from sender to the recipient is complete and as expected: such complete transmission chains can be said to be valid. In some examples, the information contained within the transmission chain may also indicate different types of encryption and/or processing applied to the data package as it is transmitted from the sender to the recipient. As shown in examples 1000 and 1050 of FIGS. 10a and 10b, there is a transmission chain showing the transmission of a data package from a sending device 1010 to a receiving device 1050 via servers A, B, C and D.

Once the header data of the data package has been received, at step 920, a validity characteristic of the header data is obtained. The validity characteristic is representative of whether the transmission chain is valid. This can be based on a number of different factors, including but not limited to whether the transmission chain is complete and what would be expected and/or whether the encryption and other characteristics of the data package can be reversed to validate the data package came from the sender indicated.

In example 1000 shown in FIG. 10a, the data package 1030 is transmitted from sending device 1010 through servers A, B, C, and D before being received at the recipient device 1020. The header of data package 1030 received at the recipient device 1020 is then analysed to determine whether it is valid. In example 1000, the header of the data package 1030 indicates the transmission chain A→B→C→D which accurately represents the actual transmission of the data package from the sending device 1010 to the recipient device 1020, and therefore the analysis can indicate that the transmission chain is a complete transmission chain, and is therefore valid.

In example 1050 shown in FIG. 10b, the data package 1040 is transmitted from sending device 1010 through servers A, B, C, and D before being received at the recipient device. The header data of the data package 1040 received at the recipient device 1020 is then analysed to determine whether it is valid. In Example 1050, the header of the data package 1040 indicates that the transmission chain is A→B→X→D which is not representative of the actual transmission chain since the data package 1040 has been intercepted at server B and forwarded to server X before being passed back to server D. As such, the analysis indicates that the transmission chain is invalid. As mentioned above, the analysis may in addition to, or alternatively, check a number of other characteristics of the header data, such as whether there is valid encryption.

Once the validity of the data package is determined, the method 900 proceeds to step 930 where the recipient of the data package is notified of the validity characteristic and can make a decision on the veracity of the data package received. For example, if the transmission chain of the data package is invalid there is a possibility that the data package has been intercepted and therefore may be indicative of a malicious data package. Conversely, if it is determined that the transmission chain is valid then this is indicative that the data package has been received from the sender via a known and verifiable route. As such, this can be used to indicate that the data package has not been intercepted. The notification may involve a visual display in the recipient device's user interface or other notification, such as an indication that a potentially threatening data package has been received.

In some examples, when it is determined that the transmission chain is invalid, the transmission chain may be edited, where possible, to correct any deficiencies such that the transmission chain can be said to be valid. This may be achieved by analysing the transmission chain and reconstructing the header data based on the actual redirects undertaken. This edited transmission chain may then be reverified such that the validity characteristic returned is valid.

Determining the validity of the transmission chain may also involve determining the source of the data package based on at least an internet protocol address of the source of the data package, the geographic location of the data package and a domain of the source of the data package. It will be appreciated that other data may be used when determining the validity of the transmission chain. In some examples, the reconstructed transmission chain may be validated based on these pieces of information.

Figure 11:
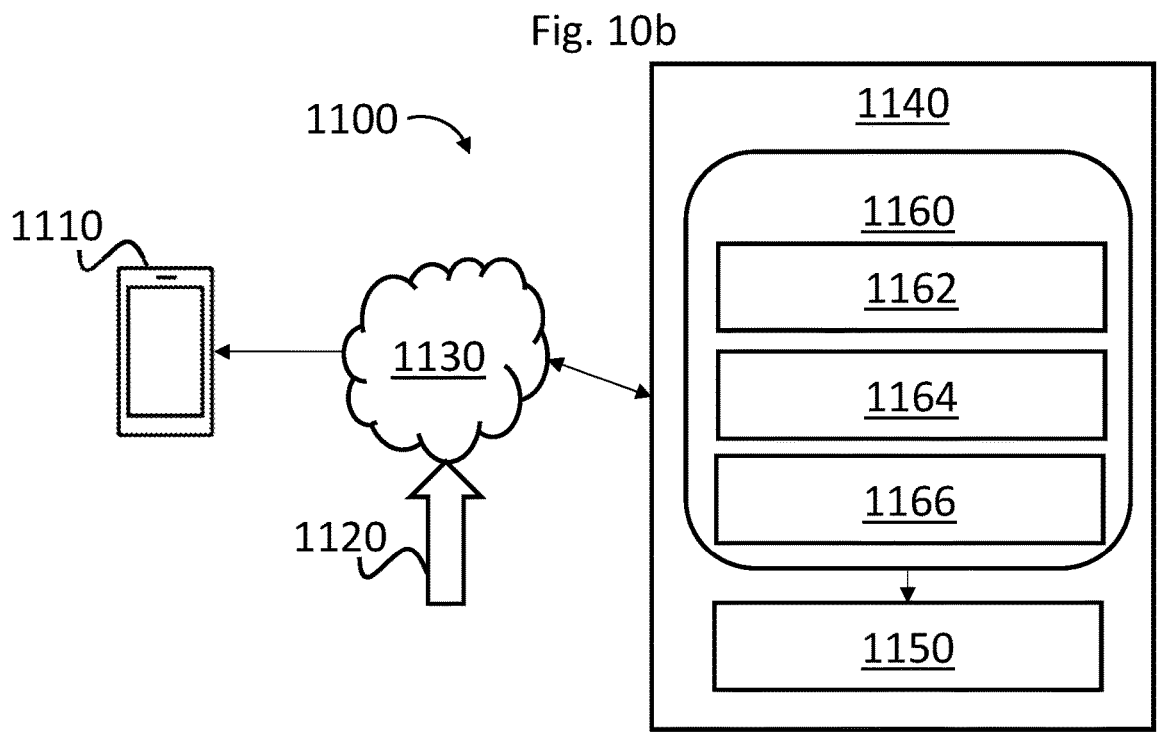
FIG. 11 is a schematic representation of a system for classifying a data package according to the third example.

FIG. 11 shows a system 1100 comprising hardware components configured for operating the framework 200 described above in relation to FIG. 2, for classifying data packages in accordance with the method 900 described above with reference to FIG. 9. The system 1100 comprises a recipient device 1110. The recipient device 1110 may be any suitable device for sending and/or receiving data packages. For example, the recipient device 1110 can be a mobile telephone, hand-held or laptop device, a desktop computer, a multiprocessor system, a microprocessor-based system, or a programable consumer electronic device comprising appropriate transmitting and/or receiving capabilities. To facilitate the transmission and/or receiving capabilities, the recipient device 1110 may comprise a network adaptor (not shown) that is arranged to facilitate communication with any number of remote resources via a network 1130 such as a local area network (LAN), a general wide area network (WAN), and/or a public network (e.g. the Internet). The network adaptor may be configured to communicate using either a wired or wireless communication method, such as cellular connectivity (LTE, 3G, 4G, or 5G), ethernet, or over a Wi-Fi network. It will be appreciated that other types of recipient device 1110 and transmitting and/or receiving capabilities may be used.

The system 1100 is arranged to receive a data package 1120, such as data package 100 described above with reference to FIG. 1. The data package 1120 is addressed to the recipient and is received by the recipient device 1110 via the network 1130. The data package 1120 is received from a sending device (not shown) via one or more intermediary servers (not shown), such as servers A, B, C, and D described above with reference to the examples 1000 and 1050 of FIGS. 10*a*, and 10*b*.

The system 1100 comprises a remote server 1140 which may be implemented in hardware, or maybe an AWS server or other server provided by a cloud services provider; furthermore, multiple remote servers may be used, each being provided by separate cloud computing service providers to provide the services required to implement the method 900 described above. The remote server 1140 may be configured on the same network as the sending device (not shown) and/or recipient device 1110, or alternatively, may be accessed via an external network such as the internet. It will be appreciated that the remote server 1140 may be on the same network as at least one of the sending device (not shown) or recipient device 1110, for example where the remote server belongs to an organization's network and the recipient and/or sender are part of that organization connecting to the organization's network using their respective devices. The recipient device 1110 may interact with the remote server 1140 using an API (not shown) as described above in relation to FIG. 2. The API is arranged to send and/or receive commands and data between the recipient device 1110 and the remote server 1140.

The remote server 1140 comprises at least some of the components of the framework 200 described above for implementing the method 900. In particular, the remote server 1140 comprises a processor 1150 for processing a data package received from a sending device. The processor 1150 uses the classifier 1160 to process the received data package and classify the data package and send an indication of the outcome of the classification such as a notification, to the recipient device 1110.

The classifier 1160 comprises a number of modules 1162, 1164, and 1166 arranged to implement the method 300 described above. These modules 1162, 1164, 1166 may be hardware-implemented or software-implemented and configured to implement at least some of the steps described above with reference to method 900. The classifier 1160 comprises at least:

an input module 1162 arranged to receive/obtain the data package 1120 from a sending device, possibly via the network 1130;

a validity determination module 1164 arranged to analyse at least the header data of the data package 1120 to determine a validity characteristic of the transmission chain; and a notification module 1166 arranged to notify the recipient, possibly via a user interface of the recipient device 1110 of the validity characteristic of the header data of the data package 1120.

In examples where the remote server 1140 is implemented in a cloud computing environment the classifier 1160 may be implemented in a virtual private cloud and arranged to process the data package using a software-implemented representation of each of the modules 1162, 1164, 1166 described.

In some examples, the system 1100 may also comprise storage for storing data used by the classifier when performing the method 900. The storage may be a solid-state drive (SSD) or other semiconductor-based RAM; a ROM, for example, a CD ROM or a semiconductor ROM; a magnetic recording medium, for example, a floppy disk or hard disk; optical memory devices in general, although it will be appreciated that other storage mediums may be used. The storage may be accessed via a local area LAN, a WAN, and/or a public network (e.g. the Internet) via a network adaptor. The network adaptor may be configured to communicate using either a wired or wireless communication method, such as cellular connectivity (LTE, 3G, 4G, or 5G), ethernet, or over a Wi-Fi network. The storage may be separate from the other resources of the system 1100, or it may form part of the remote server 1140, or maybe a virtual component associated with a cloud computing implementation of the system 1100. In yet further examples, the storage may be located on another server in a different location to the remote server 1140.

5. Trust Bands

Figure 12:
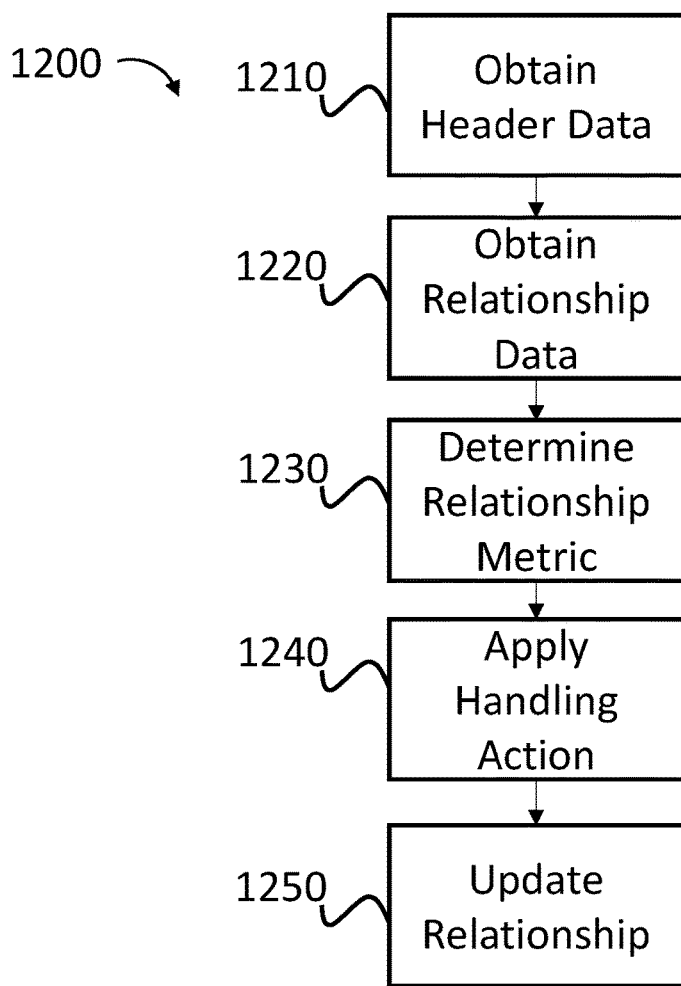
FIG. 12 is a flowchart showing a method for classifying a data package using the exemplary framework of FIG. 2, according to a fourth example.
Figure 13:
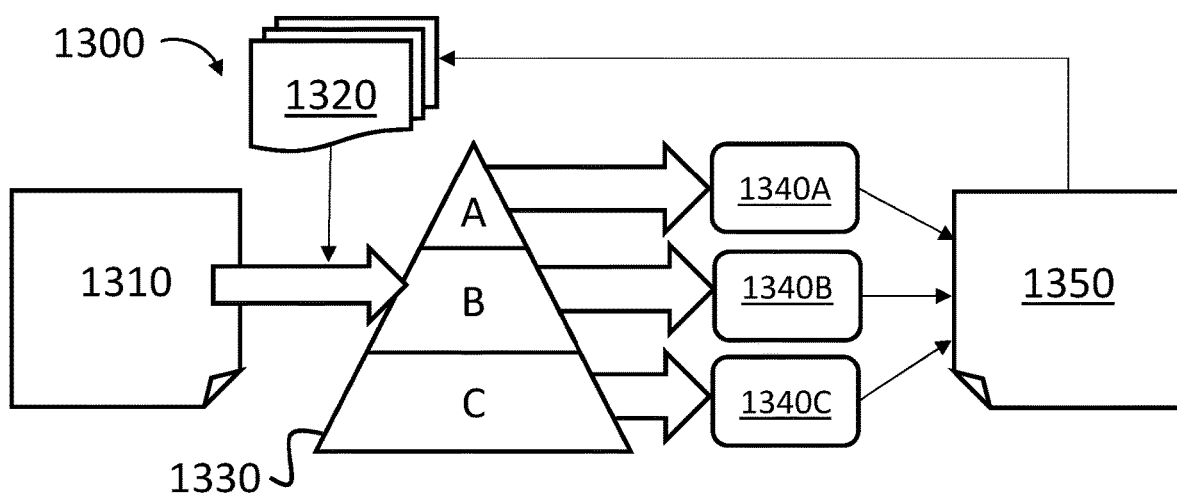
FIG. 13 is an exemplary representation of the processing of the data package in accordance with the method of FIG. 12.

FIG. 12 is a flowchart showing a method 1200 for classifying a received data package using the framework 200 described above with reference to FIG. 2. The classification scheme described in relation to method 1200 is one of the trust bands, whereby the header data of a data package, such as header data 110 of data package 100 described in relation to FIG. 1 above is analysed. This analysis may involve use of relationship data representing a relationship between the sender and the at least one recipient in order to determine a relationship metric indicative of a level of trust associated with the data package. The relationship metric may then be used to determine how to handle the data package. The data package may be implemented via a request from a receiving device to the framework using an API as described above. The method 1200 will be described below with reference to example 1300 shown in FIG. 13.

At step 1210 the header data of the data package sent from a sender to the recipient such as the header data 110 of data package 100 described above with reference to FIG. 1 is obtained. One such example of a data package is an email, such as the email 1310 shown in FIG. 13. The header data is the header data of the email 1310 which contain information such as the time the email was sent, sender address, recipient address or addresses, and a transmission chain. It will be appreciated that the header data may comprise other information. The header data of the data package may comprise a plurality of recipients, for example, in the email 1310, there may be a number of cc'd recipients in addition to a primary recipient.

Once the header data of the data package has been obtained, the method 1200 proceeds to step 1220, where relationship data 1320 is obtained from a database. As described above in relation to the framework 200 in FIG. 2, the database may be stored in storage associated with the framework and contain information relating to previous instances where data packages have been sent between the sender and at least one of the recipients. For example, where the data package is an email 1310 as in example 1300, the relationship data 1320 may comprise the characteristics of previous email messages and/or the content of previous email messages, including but not limited to the time the email message was sent, other recipients of the message and common features of previous messages, which when taken together represent characteristics of the relationship between the sender and the recipient. Where a data package has multiple recipients, relationship data between the sender and each of the recipients may be obtained. In some examples, where data packages are often sent between a sender and a group comprising multiple recipients, the relationship data 1320 may represent said group of recipients. This can result in the more efficient analysis of the data package since the relationship data of the group is analysed, instead of multiple different relationship data for each of the sender-recipient pairings.

Once the relationship data 1320 has been obtained from the storage, the method 1200 proceeds to step 1230 where a relationship metric is determined based on the relationship between the sender and the recipient. The relationship between the sender and the recipient may be based on several factors, including but not limited to the communication history between the sender and at least one of the recipients. For example, where there are multiple recipients, as mentioned above, the relationship data 1320 obtained from the database may relate to each individual recipient and/or may relate to the group of recipients. In such examples, the individual sender-recipient relationship data and the group sender-recipients relationship data may be combined for use when classifying the rata package 1310.

The communication history may comprise data such as a frequency of transmission of data packages between the sender and the one or more recipients. The frequency of transmission between the sender and the one or more recipients can be indicative of the level of trust associated with new data packages that are sent. As such, the relationship metric may be proportional to the frequency of transmission such that the more often a sender and one or more recipients communicate, the higher the trust indicated by the relationship metric. The communication history may also comprise data indicative of an elapsed time since a previous transmission of a data package between the sender and the at least one recipient. This may be calculated based on a transmission time of the last communication stored in the relationship data rather than the actual time elapsed. In such a case the relationship metric may be inversely proportional to the time elapsed since the previous transmission of a data package such that the longer it is since a previous data package was sent, the lower the associated trust.

In addition to data regarding the receipt and time of receipt of data packages between the sender and at least one recipient other features of the data package may be used when determining the relationship metric, for example, data relating the recipient(s) and sender. Where the addresses of the sender and recipients are similar or contain identical portions, this can be indicative of an increased level of trust. One such example would be an email where the domain of the sender and the domain of the recipient is the same or from a related company. In such a case, as there is an increased likelihood that the sender and recipient(s) know each other and as such the relationship metric should indicate an increased level of trust. Another feature that may be used to determine the relationship metric includes the direction of transmission of previous data packages. For example, where data packages are always sent from one person to another, and the other person does not respond or rarely responds this can be indicative of a lack of trust, and as such the relationship metric should indicate this. It will be appreciated, however, that there are some instances where the direction of the transmission is in one direction. In such examples, there may be a white list of senders whereby unidirectional transmission does not affect the relationship metric. In some examples, rather than indicating a complete lack of trust, it may be desirable to limit the level of trust a particular sender can reach when there is unidirectional transmission. In such an example, the trust level may be limited by a user-definable or predetermined ceiling value.

The relationship metric may also be determined based on a known list, or lists, of senders. For example, senders which are known to send malicious content may be added to a blacklist such that any data packages which are received from that sender are automatically flagged as malicious. Conversely, trusted senders may be added to a whitelist such that any data packages received from that sender are flagged as safe.

Whilst a number of different features to be considered when generating the relationship metric are described above, it will be appreciated that there are several other features that may be considered.

The relationship metric may be based on a combination of the above features such that it is indicative of a level of trust associated with the sender. The level of trust may be set at different levels, such as level A, level B, and level C. Level A may be assigned to a data package from the whitelisted senders for example, whereas level C may be data packages sent from the blacklisted senders. Over time, a data package sent from a sender may be assigned to a given level, and the level may be increased and/or decreased after a given time period. This prevents a sender from spamming the recipient with multiple messages to increase their level of trust.

Turning to back to example 1300, the relationship data 1320 can be used to determine the relationship metric of the received data package 1310. As described above the relationship metric is indicative of a level of trust represented by 1330, where level A may be indicative of the highest level of trust, such as the level reserved for frequent contacts and/or whitelisted senders, whereas level C is indicative of less frequent, and therefore less trusted and/or blacklisted senders. It will be appreciated that there may be more or less than three trust levels indicated by the relationship metric, and as described above the trust level associated with a particular sender may vary over time, based on the factors used when determining the relationship metric.

Once the level of trust has been determined using the relationship metric, method 1200 proceeds to step 1240 where a handling action is applied to the data package. Each trust level, such as level A, level B, and level C in representation 1330, may have an associated handling action, such as handling action 1340A, 1340B, and 1340C respectively. As such, depending on the level of trust a different handling action may be applied resulting in one or more different outcomes. For example, when a data package is determined to be in level A, handling action 1340A may be applied to the data package which provides a banner notification indicating that the data package is from a trusted sender. Conversely, when a data package is determined to be in level C, handling action 1340C may be applied whereby the data package is quarantined and a notification may be sent to the recipient. It will be appreciated that multiple handling actions may be applied to the data packages, and as such there may be handling actions that are common to more than one trust level. The result of the application of the one or more handling actions to the data package is a processed data package 1350.

Once the data package has been processed the method 1200 proceeds to step 1250 where the relationship data 1320 is updated based on the processed data package 1350, which in some examples can include indicating what level of trust was assigned to the data package, what handling actions, if any were applied, along with data to update the communication history.

Figure 14:
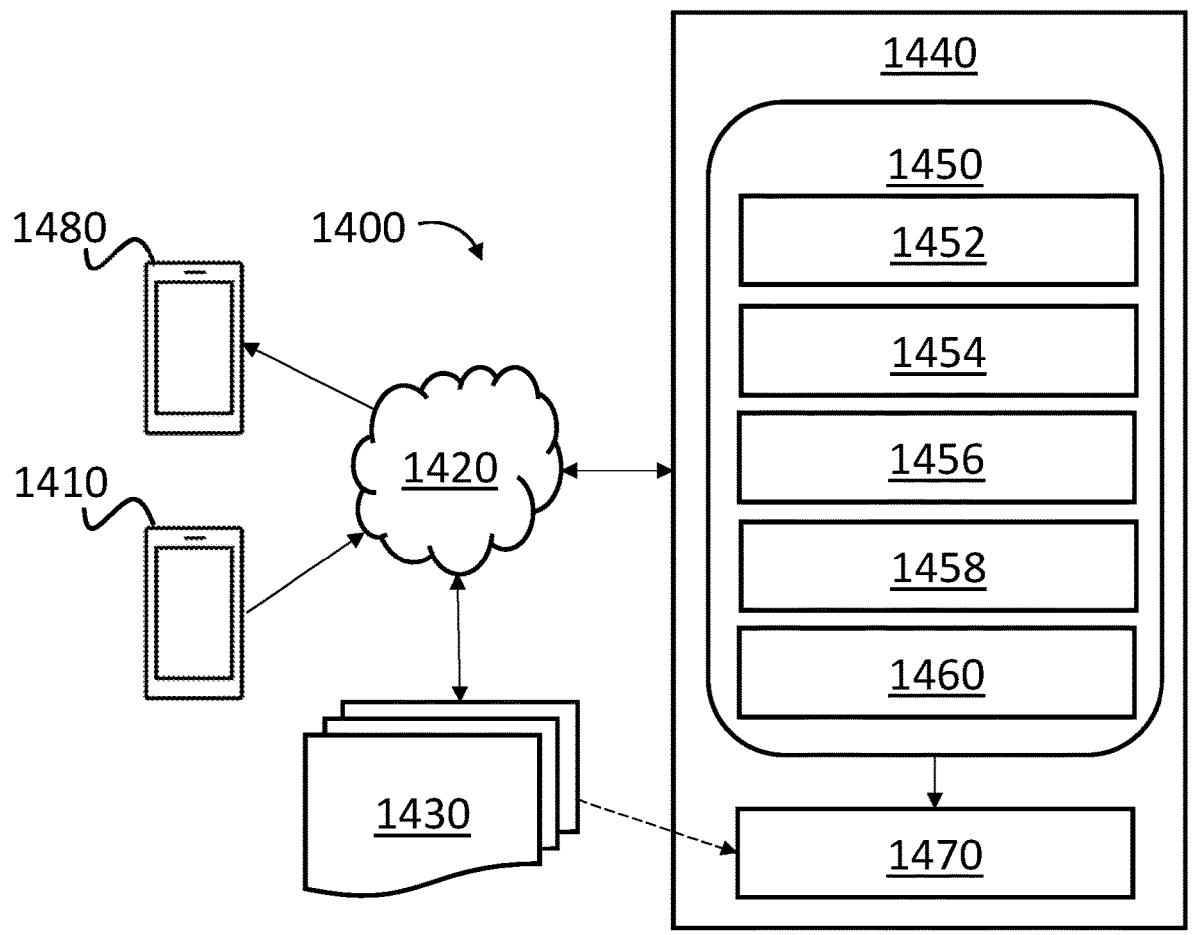
FIG. 14 is a schematic representation of a system for classifying a data package according to the fourth example.

FIG. 14 shows a system 1400 comprising hardware components configured for operating the framework 200 described above in relation to FIG. 2, for classifying data packages in accordance with the method 1200 described above with reference to FIG. 12. The system 1400 comprises at least one sending device 1410 and at least one recipient device 1480. The sender and recipient devices 1410, 1480 may be any suitable device for sending and/or receiving data packages. For example, the sender and recipient devices 1410, 1480 can be a mobile telephone, hand-held or laptop device, a desktop computer, a multiprocessor system, a microprocessor-based system, or a programable consumer electronic device comprising appropriate transmitting and/or receiving capabilities. To facilitate the transmission and/or receiving capabilities, the sender and recipient devices 1410, 1480, may comprise a network adaptor (not shown) that is arranged to facilitate communication with any number of remote resources via a network 1420 such as a local area network (LAN), a general wide area network (WAN), and/or a public network (e.g. the Internet). The network adaptor may be configured to communicate using either a wired or wireless communication method, such as cellular connectivity (LTE, 3G, 4G, or 5G), ethernet, or over a Wi-Fi network. It will be appreciated that other types of sender and recipient devices 1410, 1480, and transmitting and/or receiving capabilities may be used.

The system 1400 also comprises storage 1430 for storing at least the relationship data for use by the classifier as described above in relation to method 1200. The storage 1430 may be a solid-state drive (SSD) or other semiconductor-based RAM; a ROM, for example, a CD ROM or a semiconductor ROM; a magnetic recording medium, for example, a floppy disk or hard disk; optical memory devices in general, although it will be appreciated that other storage mediums may be used. The storage 1430 may be accessed via a local area LAN, a WAN, and/or a public network (e.g. the Internet) via a network adaptor. The network adaptor may be configured to communicate using either a wired or wireless communication method, such as cellular connectivity (LTE, 3G, 4G, or 5G), ethernet, or over a Wi-Fi network. Whilst the storage 1430 is shown as separate from the other resources of the system 1400, it will be appreciated that the storage 1430 may form part of the remote server 1440, or maybe a virtual component associated with a cloud computing implementation of the system 1400. In yet further examples, the storage 1430 may be located on another server in a different location to the remote server 1440. Whilst the example system 1400 shown in FIG. 14 shows the storage 1430 interacting with the remote server 1440 via a network connection, it will be appreciated that the storage 1430 may interact with the remote server via a direct connection as indicated by the dotted arrow.

The system 1400 comprises a remote server 1440 which may be implemented in hardware, or maybe an AWS server or other server provided by a cloud services provider; furthermore, multiple remote servers may be used, each being provided by separate cloud computing service providers to provide the services required to implement the method 1200 described above. The remote server 1440 may be configured on the same network as the sender and recipient devices 1410, 1480, or alternatively may be accessed via an external network such as the internet. It will be appreciated that the remote server 1440 may be on the same network as at least one of the sending or recipient devices 1410, 1480, for example where the remote server belongs to an organization's network and the recipient and/or sender are part of that organization connecting to the organization's network using their respective devices. The sender and recipient devices 1410, 1480 may interact with the remote server 1440 using an API (not shown) as described above in relation to FIG. 2. The API is arranged to send and/or receive commands and data between each of the sender and recipient devices 1410, 1480, and the remote server 1440.

The remote server 1440 comprises at least some of the components of the framework 200 described above for implementing the method 1200. In particular, the remote server 1440 comprises a processor 1470 for receiving a data package from the sending device 1410 and data, such as the relationship from storage 1430. The data may be received directly from the storage 1430 as indicated by the dotted arrow or may in some embodiments be received via the network 1420. The processor 1470 uses the classifier 1450 to process the received data package and classify the data package before forwarding the processed data package, or an indication of the outcome of the classification such as a notification, to the recipient device 1480.

The classifier 1450 comprises a number of modules 1452, 1454, 1456, 1458, and 1460 arranged to implement the method 1200 described above. These modules 1452, 1454, 1456, 1458, 1460 may be hardware-implemented or software-implemented and configured to implement at least some of the steps described above with reference to method 1200. The classifier 1450 comprises at least:

- an input module 1452 arranged to receive/obtain the header data package of the data package from a sending device 1410, possibly via the network 1420;
- a memory access module 1454 for obtaining data from storage 1430, such as the relationship data indicative of a relationship between the sender and the recipient(s);
- a determination module 1456 for determining, based on the obtained relationship data, a relationship metric, where the relationship metric is based on at least a previous communication history between the sender and the recipient(s);
- an application module 1458 for applying at least one handling action to the data package based on the relationship metric; and
- an updating module 1460 for updating the relationship data representative of the relationship between the sender and the at least one recipient in the database based on the received data package.

In examples where the remote server 1440 is implemented in a cloud computing environment, the classifier 1450 may be implemented in a virtual private cloud and arranged to process the data package using a software-implemented representation of each of the modules 1452, 1454, 1456, 1458, and 1460 described.

6. Conclusion

At least some aspects of the embodiments described herein with reference to FIGS. 1-14 comprise computer processes performed in processing systems or processors. However, in some examples, the disclosure also extends to computer programs, particularly computer programs on or in an apparatus, adapted for putting the disclosure into practice.

The program may be in the form of non-transitory source code, object code, a code intermediate source and object code such as in partially compiled form, or any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

It is to be understood that although some of the disclosure above relates to the use of cloud computing, the implementation described is not limited to a cloud computing environment. Rather, embodiments of the present disclosure are capable of being implemented in conjunction with any other type of computing environment.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples.

The above embodiments are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method for classifying a received data package, using a framework, the framework comprising:
   at least one classifier;
   a processing component configured to execute instructions for processing the received data package using the at least one classifier; and
   a database for storing at least relationship data indicating a plurality of relationships between a sender and at least one recipient;
   wherein the at least one classifier is configured to perform the steps of:
      obtaining header data of the received data package, the header data comprising at least user identifiers corresponding to at least the sender and the at least one recipient;
      obtaining relationship data, from the database, the data representing a relationship between the sender and the at least one recipient, wherein the relationship is indicative of at least a previous communication history between the sender and the at least one recipient;
      determining a relationship metric between the sender and the at least one recipient based on the relationship, the relationship metric being indicative of a plurality of different levels of trust between the sender and the at least one recipient, wherein:
         determining the relationship metric comprises:
            establishing a direction of transmission for each data package in the previous communication history between the sender and the at least one recipient;
            determining a frequency of transmission between the sender and the at least one recipient; and
            when the direction of transmission of each data package in the previous communication history is one way, and when the frequency of transmission exceeds a predetermined frequency threshold in a predetermined time period, the relationship metric has an upper threshold value that limits a level of trust achievable for the sender;
      when the relationship metric has the upper threshold value, applying at least one handling action to the received data package, wherein the handling action consists of quarantining the data package or encrypting the data package or preventing access to the data package; and
      updating the relationship data between the sender and the at least one recipient in the database based on the handling action that is applied for the received data package.

2. The method of claim 1, further comprising the step of determining a unique sender identifier, and wherein the relationship metric is based on relationship data between the unique sender identifier and the at least one recipient.

3. The method of claim 1, wherein determining the relationship metric based on the communication history, is further based on at least one of:
   a similarity in an address of the sender and an address of the at least one recipient; and
   an elapsed time since a previous transmission of a data package between the sender and at least one recipient.

4. The method of claim 1, wherein the relationship metric is proportional to the frequency of transmission of the data packages between the sender and the at least one recipient.

5. The method of claim 3, wherein the relationship metric is inversely proportional to the elapsed time since the previous transmission of a data package between the sender and the at least one recipient.

6. The method of claim 3, wherein the relationship metric is increased when the similarity of the address of the sender and the address of the at least one recipient is above a predetermined threshold.

7. The method of claim 1, wherein the relationship metric is further based on at least one of: a whitelist of senders; and a blacklist of senders.

8. A system for classifying a received data package, the system comprising:
   a user device for receiving the data package;
   storage for storing at least relationship data indicating a plurality of relationships between a sender and at least one recipient; and
   a remote server for receiving the data package from a sender, the remote server providing at least one processor configured to execute instructions to process the data package using at least one classifier, wherein the at least one classifier is configured to:
      obtain header data of the received data package, the header data comprising at least user identifiers corresponding to at least the sender and the at least one recipient;
      obtain relationship data, from the database, the data representing a relationship between the sender and the at least one recipient, wherein the relationship is indicative of at least a previous communication history between the sender and the at least one recipient;

determine a relationship metric between the sender and the at least one recipient based on the relationship, the relationship metric is indicative of a plurality of levels of trust between the sender and the at least one recipient, wherein:

determining the relationship metric comprises:

establishing a direction of transmission for each data package in the previous communication history between the sender and the at least one recipient;

determining a frequency of transmission between the sender and the at least one recipient; and when the direction of transmission of each data packages in the previous communication history is one way, and when the frequency of transmission exceeds a predetermined threshold in a predetermined time period, the relationship metric has an upper threshold value that limits a level of trust achievable for the sender;

when the relationship metric has the upper threshold value, apply at least one handling action to the received data package, wherein the handling action consists of quarantining the data package or encrypting the data package or preventing access to the data package; and update the relationship between the sender and the at least one recipient in the database based on the handling action that is applied for the received data package.

9. The system of claim 8, wherein the classifier is configured to determine a unique sender identifier, and wherein the relationship metric is based on relationship data between the unique sender identifier and the at least one recipient.

10. The system of claim 8, wherein classifier determines the relationship metric based on the communication history, the communication history comprising data associated with at least one of:

a similarity in an address of the sender and an address of the at least one recipient; and an elapsed time since a previous transmission of a data package between the sender and at least one recipient.

11. The system of claim 8 wherein the relationship metric is proportional to the frequency of transmission of the data packages between the sender and the at least one recipient.

12. The system of claim 8, wherein the relationship metric is further based on at least one of: a whitelist of senders; and a blacklist of senders.

13. A non-transitory computer-readable storage medium comprising a set of computer-readable instructions stored thereon, which when executed by at least one processor are arranged to classify a data package via a framework, the framework comprising:

at least one classifier;

a processing component for processing the received data package using the at least one classifier;

a database for storing at least relationship data indicating a plurality of relationships between a sender and at least one recipient;

wherein the at least one classifier is configured to perform the steps of:

obtaining header data of the received data package, the header data comprising at least user identifiers corresponding to at least the sender and the at least one recipient;

obtaining relationship data, from the database, the data representing a relationship between the sender and the at least one recipient, wherein the relationship is indicative of at least a previous communication history between the sender and the at least one recipient;

determining a relationship metric between the sender and the at least one recipient based on the relationship, the relationship metric being indicative of a plurality of levels of trust between the sender and the at least one recipient, wherein:

determining the relationship metric comprises:

establishing a direction of transmission for each data package in the previous communication history between the sender and the at least one recipient;

determining a frequency of transmission between the sender and the at least one recipient; and when the direction of transmission of each data package in the previous communication history is one way, and when the frequency of transmission exceeds a predetermined frequency threshold in a predetermined time period, the relationship metric has an upper threshold value that limits a level of trust achievable for the sender;

when the relationship metric has the upper threshold value, applying at least one handling action to the received data package, wherein the handling action consists of quarantining the data package or encrypting the data package or preventing access to the data package; and updating the relationship between the sender and the at least one recipient in the database based on the handling action that is applied for the received data package.

\* \* \* \* \*